UNITED STATES PATENT OFFICE.

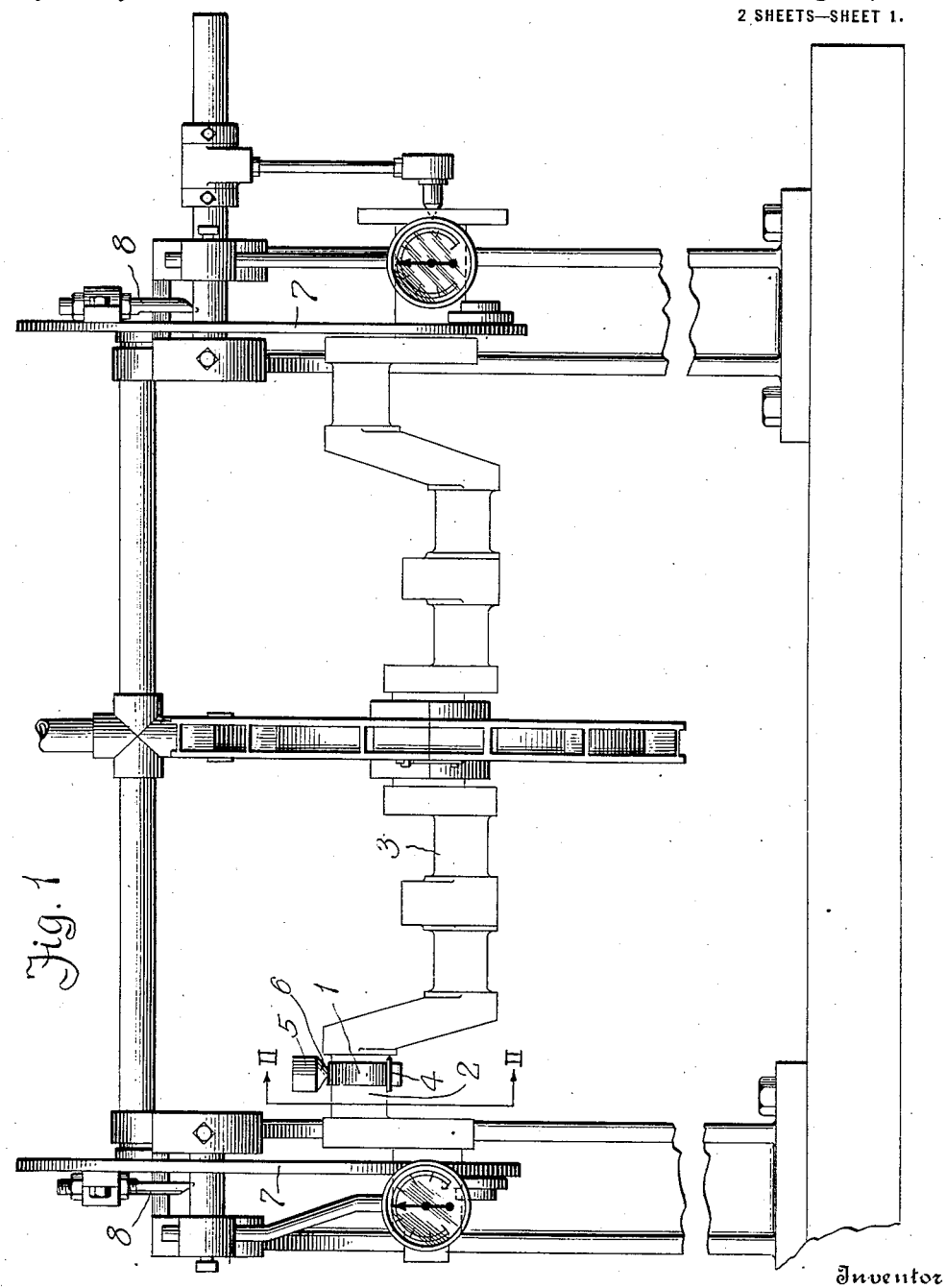

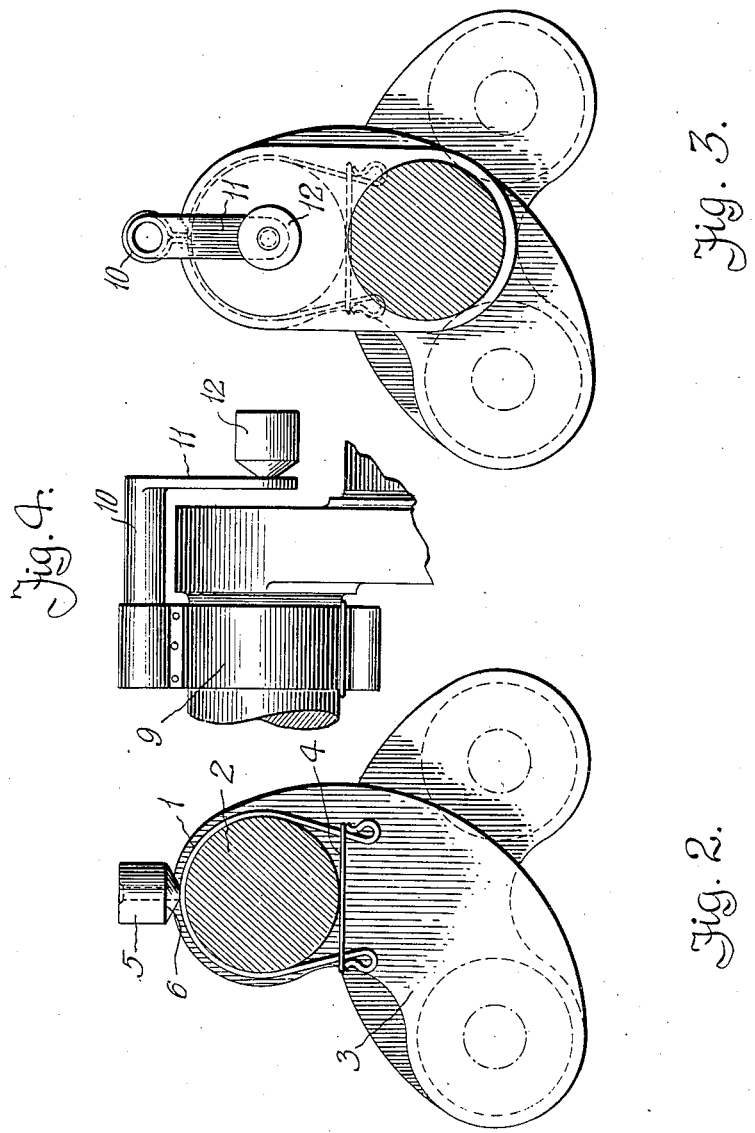

HENRY HOPKINS, OF DETROIT, MICHIGAN, ASSIGNOR TO CONTINENTAL MOTORS CORPORATION, OF DETROIT, MICHIGAN, A CORPORATION OF VIRGINIA.

BALANCING-CLIP FOR SHAFTS.

1,275,429.  Specification of Letters Patent.  Patented Aug. 13, 1918.

Application filed June 25, 1917. Serial No. 176,721.

*To all whom it may concern:*

Be it known that I, HENRY HOPKINS, a citizen of the United States of America, residing at Detroit, in the county of Wayne and State of Michigan, have invented certain new and useful Improvements in Balancing-Clips for Shafts, of which the following is a specification, reference being had therein to the accompanying drawings.

In obtaining dynamic balance in crank shafts of the multi-throw type used in internal combustion engines, it is the usual practice to pass the cranks through a testing device, bringing them to balance by the addition of counterweights temporarily applied to the necessary points, and then to forward the cranks and attached counterweights to a department where the latter are either permanently secured or else a correspondingly amount of metal is taken off from the opposite portion of the shaft. In doing this the workman is guided to a large extent by his experience and skill in estimating the amount necessary for removal and it is difficult to always obtain this.

This invention relates to a balance equipment whereby the crank shaft may be rapidly brought to balance by means which, when the shaft is carried on for final adjustment, clearly indicates to the workman a very close approximation of the metal to be taken out and does this in such a manner as to obviate any particular calculation on his part, This invention consists in the matters hereinafter set forth, and more particularly pointed out in the appended claims.

In the drawings.

Figure 1 is a view in elevation of a balancing clip embodying the invention applied to a shaft mounted in a crank shaft balancing machine;

Fig. 2 is an enlarged view in detail, taken in cross section on or about line II—II of Fig. 1;

Fig. 3 is a view in detail of a modification of the device; and

Fig. 4 is another view of the modified form.

As herein shown, a band 1 of suitable spring material is bent to embrace the crank pin portion 2 of a multi-throw shaft 3, and may be held in position by a suitable closed link 4 so as to frictionally engage and tightly grip the shaft. A counterbalance weight 5 is attached to the strip or band between the end portions thereof. This is preferably of the same material or at least of material of the same specific gravity as the shaft material for which the clips are to operate as adjusting devices and is in the form of a cylindrical plug of a known diameter with the conoidal end portion 6 thereon secured to the band, or in reversed positions, the weight being designed to correspond to the plug of metal that is removed by a conventional or standard drill. That is, for example, the plug may be the same approximately as that which would be cut out by a three-quarter inch drill moving into the metal for a distance of half an inch, and would consequently be about three quarters of an inch in diameter and about half an inch long, with the conodial end part corresponding to the same portion of the drill, the plug being being slightly smaller than the hole because it has a larger couple arm when mounted on the shaft. But in practice this difference is so slight that it is hardly discernible on casual inspection. In balancing the shaft, the clip is applied and the weight swung into proper position to overcome any overweight on the opposite side of the shaft axis of rotation. By shifting the counterweight on the shaft, the part on which it is applied can be readily made to overcome any tendency to move or weave in the shaft bearings, such movement being indicated by placing the shaft in any testing machine, such for example, as indicated in Fig. 1 wherein the shaft rests in a pair of cradles 7 swinging on knife edge supports 8, the shaft being driven appropriately so that the swinging of the cradles is unimpeded and the shaft is free to move laterally in either direction according to the effect of any surplus balanced weight in the shaft structure.

When the shaft is then carried to the place where it is finally adjusted, the operator can readily see from the size and weight as well as position, just how much to remove by appropriate boring into the shaft by a drill of the size of the applied balance weight and to a depth corresponding to the length of the weight, and of course at the proper point.

As indicated in Figs. 3 and 4 the clip may take the form shown wherein the spring band 9 has a tubular arm 10 with inset part 11, on which a weight 12 is mounted, this clip being used to bring the weight which accomplishes the balancing, in axial coincidence with the crank pin portion of the shaft to which the clip is applied. It is then comparatively easy to remove the corresponding metal on the opposing crank pin portion by boring an axial recess therein corresponding to the applied weight. The shaft may be thus balanced throughout its length, by use of the necessary number and sizes of balancing members.

As a result of this arrangement, the artisan who finally brings the shaft to adjustment, can see at a glance the size of the countervailing recess necessary to drill for the removal of metal which will lighten the overweight part and bring the shaft to running balance.

Obviously, changes in the details of construction may be made without departing from the spirit of my invention and I do not care to limit myself to any particular form or arrangement of parts.

What I claim is:—

1. Balancing means for shafts comprising a weight of the same specific gravity as the shaft to which the means is to be applied and of the form and dimensions of a countervailing recess to be drilled in such shaft, and means for adjustably securing the weight detachably on a shaft.

2. A balancing clip for shafts comprising a spring member adapted to yieldingly embrace a shaft, and a weight on the spring member made of material of the same specific gravity as the material of the shaft for which the clip is to be used, and of the form and the dimensions of a countervailing recess to be drilled in such shaft.

3. A balancing clip for shafts comprising a spring member adapted to frictionally embrace a crank pin portion of a shaft and a weight mounted thereon of material of the same specific gravity as the material of the shaft to which the clip is to be applied and of the shape and dimensions of the countervailing recess to be formed in permanently balancing such shaft.

4. A balancing clip for shafts comprising a spring member bent between its ends to conform to and frictionally embrace a crank pin portion of a shaft, a link for securing the spring member in position and a weight mounted on the spring member of material of the same specific gravity as the material of the shaft to which the clip is to be applied and of the shape and dimensions of the countervailing recess to be formed in permanently balancing such shaft.

5. A balancing clip for shafts comprising a spring band bent to frictionally embrace the crank pin portion of a crank shaft, a link detachably connecting the end portions of the spring member when in position on a shaft, and a weight secured to the spring member between the ends thereof of the same specific gravity as that of the material of the shaft for which the clip is adapted, and having the shape and dimensions of a standard recess forming tool.

6. The combination of a spring band bent between its ends to form a substantially circular loop and a link adapted to detachably connect the end portion of the band and close the loop, with a weight having the cylindrical form and conoidal end of a standard drill attached to the band between the ends thereof.

In testimony whereof I affix my signature in the presence of two witnesses.

HENRY HOPKINS.

Witnesses:
W. R. ANGELL,
D. ANDREWS.